US007088671B1

(12) United States Patent
Monsen (10) Patent No.: US 7,088,671 B1
(45) Date of Patent: Aug. 8, 2006

(54) MULTIPLE ACCESS TECHNIQUE FOR DOWNLINK MULTIBEAM DIGITAL RADIO SYSTEMS

(76) Inventor: Peter Monsen, 370 Hollow View Rd., Stowe, VT (US) 05672

( * ) Notice: Subject to any disclaimer, the term of this patent is extended or adjusted under 35 U.S.C. 154(b) by 998 days.

(21) Appl. No.: 10/110,365

(22) PCT Filed: Nov. 22, 2000

(86) PCT No.: PCT/US00/42234

§ 371 (c)(1),
(2), (4) Date: Apr. 9, 2002

(87) PCT Pub. No.: WO01/39392

PCT Pub. Date: May 31, 2001

Related U.S. Application Data

(60) Provisional application No. 60/167,472, filed on Nov. 24, 1999.

(51) Int. Cl.
*H04J 11/00* (2006.01)
*H04Q 7/00* (2006.01)

(52) U.S. Cl. ...................................... 370/203; 370/334
(58) Field of Classification Search ..................... None
See application file for complete search history.

(56) References Cited

U.S. PATENT DOCUMENTS 4,112,370 A    9/1978  Monsen .................. 325/40

(Continued)

FOREIGN PATENT DOCUMENTS

EP    0 650 271 A2    4/1995

OTHER PUBLICATIONS

"An Adaptive Receiver for Digital Signalling Through Channels With Intersymbol Interference", J.G. Proaxis and J.H. Miller, IEEE Transactions on Information Theory, vol. IT-15, No. 4, Jul. 1969, pp. 484-497.

(Continued)

*Primary Examiner*—Steven Nguyen
*Assistant Examiner*—Clemence Han
(74) *Attorney, Agent, or Firm*—Peter J. Manus; Edwards Angell Palmer & Dodge LLP (57) ABSTRACT

A multiple access communication system with communication links between one or more central nodes each with a transmitter 1 including an antenna with one or more antenna beams, and user terminals 2 located in antenna beam coverage area 3. User terminals 2 assigned to one beam coverage area 3 use multiple access channels that are mutually orthogonal for receiving digital message information. These multiple access channels are reused by other user terminals 2 in adjacent and other beam regions. Single-axis error correcting coding 4, interleaving 5, channel assignment changes 7, precoding 8, and selected 90° phase rotation 9 are used in the central node transmitter 1 to reduce potential interference at a user terminal 2 from signals using the same orthogonal multiple access channel destined for user terminals 2 in other beam coverage areas 3. The communication system can realize complete reuse of all orthogonal multiple access channels in other beam coverage areas, i.e., a reuse factor of unity.

12 Claims, 3 Drawing Sheets

U.S. PATENT DOCUMENTS

| | | | | |
|---|---|---|---|---|
| 4,328,585 | A | 5/1982 | Monsen | 375/14 |
| 4,365,338 | A | 12/1982 | McRae et al. | 375/12 |
| 4,644,562 | A | 2/1987 | Kavehrad et al. | 375/14 |
| 5,220,320 | A | 6/1993 | Assal et al. | 340/825.79 |
| 5,513,215 | A | 4/1996 | Marchetto et al. | 375/233 |
| 5,561,610 | A | 10/1996 | Schricker et al. | 342/375 |
| 5,590,399 | A | 12/1996 | Matsumoto et al. | 455/33.3 |
| 5,596,333 | A | 1/1997 | Bruckert | 342/457 |
| 5,619,503 | A | 4/1997 | Dent | 370/330 |
| 5,680,419 | A | 10/1997 | Bottomley | 375/347 |
| 5,736,959 | A | 4/1998 | Patterson et al. | 342/354 |
| 5,838,742 | A | 11/1998 | Abu-Dayya | 375/347 |
| 5,987,037 | A | 11/1999 | Gans | 370/480 |
| 6,157,811 | A | 12/2000 | Dent | 455/12.1 |
| 6,882,846 | B1 | 4/2005 | O'Byrne | |
| 2002/0107024 | A1 | 8/2002 | Dey Roy | |
| 2003/0123425 | A1 | 7/2003 | Wallon et al. | |

OTHER PUBLICATIONS

"MMSE Equalization of Interference on Fading Diversity Channels", P. Monsen, IEEE Conference on Communications, Conference Record, vol. 1, Denver, CO, Jun. 1981, pp. 12.2-1 - 12.2-5.

"Adaptive Equalization and Interference Cancellation for Wireless Communication Systems", B.C.W. Lo and K.B. Letaief, IEEE Transactions on Communications, vol. 47, No. 4, Apr. 1999, pp. 538-545.

"Dynamic Channel Assignment in High-Capacity Mobile Communications Systems", D.C. Cox and D.O. Reudink, The Bell System Technical Journal, vol. 50, No. 6, Jul.-Aug. 1971, pp. 1833-1857.

"MMSE Equalization of Interference on Fading Diversity Channels", P. Monsen, IEEE Transactions on Communications, vol. COM-32, No. 1, Jan. 1984, pp. 5-12.

"Linear Multiuser Detectors for Synchronous Code-Division Multiple Access Channels", R. Lupas and S. Verdu, , IEEE Transactions on Information Theory, vol. 35, No. 1, Jan. 1989, pp. 123-136.

"Decorrelating Decision-Feedback Multiuser Detector for Synchronous Code-Division Multiple-Access Channel", A. Duel-Hallen, IEEE Transactions on Communications, vol. COM-41, No. 2, Feb. 1993, pp. 285-290.

"A Family of Multiuser Decision-Feedback Detectors for Asynchronous Code-Division Multiple-Access Channels", A. Duel-Hallen, IEEE Transactions on Communications, vol. 43, No. 2/3/4, Feb./Mar./Apr. 1995, pp. 421-434.

"Information-Theoretic Considerations for Symmetric, Cellular, Multiple-Access Fading Channels-Part I", S. Shamai and A.D. Wyner, IEEE Transactions on Information Theory, vol. 43, No. 6, Nov. 1997, pp. 1877-1894.

Mobile Station-Base Station Compatibility Standard for Dual-Mode Wideband Spread Spectrum Cellular System, EIA/TI IS-95, 1992. (Abstract Only).

"Feedback Equalization for Fading Dispersive Channels", P. Monsen, IEEE Transactions on Information Theory, Jan. 1971, pp. 56-64.

Least Square Estimation with Application to Digital Signal Processing, A.A. Giordano and F.M. Hsu, John Wiley and Sons, New York, NY, 1985, Chapter 3.3.

*Copy of European Search Report dated Apr. 3, 2003 citing these refernces.

"Blind Multiuser Detection: A Subspace Approach", X. Wang and H.V. Poor, IEEE Transactions on Information Theory, vol. 44, No. 2, Mar. 1998, pp. 677-690.

"Minimum Probability of Error for Asynchronous Gaussian Multiple-Access Channels", S. Verdu, IEEE Transactions on Inforamtion Theory, vol. IT-32, No. 1, Jan. 1986, pp. 85-96.

"Adaptive Space-Time Feedforward/Feedback Detection for High Data Rate CDMA in Frequency-Selective Fading," J. Smee and S.C. Schwartz, IEEE Transactions on Communications, vol. 49, No. 2, Feb. 2001, pp. 317-328.

"Decision Feedback Equalization for CDMA in Indoor Wireless Communications", M. Abdulrahman, A.U.H. Sheikh, and D.D. Falconer, IEEE Journal on Selected Areas in Communications, vol. 12, No. 3, May 1994, pp. 698-706.

"Channel Equalization for Block Transmission Systems", G.K. Kaleh, IEEE Journal on Selected Areas in Communications, vol. 13, No. 1, Jan. 1995, pp. 110-121.

"Tracking of Time-Varying Mobile Radio Channels-Part I: The Wiener LMS Algorithm," L. Lindbom, M. Sternad, and A. Ahlen., IEEE Transactions on Communcations, vol. 49, No. 12, Dec. 2001, pp. 2207-2217.

"Block Channel Equalization in the Presence of a Cochannel Interferent Signal," A. Ginesi, G.M. Vitetta, and D.D. Falconer, IEEE Journal on Selected Areas in Communications, vol. 17, No. 11, Nov. 1999, pp. 1853-1862.

"Blind Adaptive Multiuser Detection", M. Honig, U. Madhow, and S. Verdu, IEEE Transactions on Information Theory, vol. 41, No. 4, Jul. 1995, pp. 944-960.

"On Multipath Channel Estimation for CDMA Systems Using Multiple Sensors," Sengupta et al., IEEE Transactions on Communcations, vol. 49, No. 3, Mar. 2001, pp. 543-553.

"Adaptive Receiver Structures for Asynchronous CDMA Systems", P.B. Rapajic and B.S. Vucetic, IEEE Journal of Selected Areas in Communications, vol. 12, No. 4, May 1994, pp. 685-697.

"Performance Analysis of Minimum Variance CDMA Receivers", M.K. Tsatsanis and Z. Xu, IEEE Transactions on Signal Processing, vol. 46, No. 11, Nov. 1998, pp. 3014-3022.

"An Algorithm For Reducing the Bandwidth and Profile of a Sparse Matrix", N.E. Gibbs, W.G.
Poole, Jr., and P.K. Stockmeyer, Siam J. Numer.Anal., vol. 13, No. 2, Apr. 1976, pp. 236-250.

MULTIPLE ACCESS TECHNIQUE FOR DOWNLINK MULTIBEAM DIGITAL RADIO SYSTEMS

CROSS-REFERENCE TO RELATED APPLICATIONS

This application is the National Stage of International application No. PCT/US00/42234 filed Nov. 22, 2000, which in turn claims the benefit of U.S. provisional application Serial No. 60/167,472 filed Nov. 24, 1999.

BACKGROUND OF THE INVENTION

1. Field of the Invention

This invention relates generally to multiple access communication in digital radio systems, and more particularly to improvements in the multiple access communication from one or more centrally based nodes having multibeam antennas to fixed remote user terminals and/or mobile user terminals.

2. Background

Multiple access radio systems provide communication services for fixed remote user terminals and/or mobile user terminals. Examples of multiple access radio systems include land mobile radio networks, cellular mobile radio networks, and wideband radio networks between one or more central nodes and fixed subscribers. The central node in a multiple access radio system may use multibeam antennas for increasing system capacity and improving communications quality. The forward link or downlink in a multiple access radio system is a communications link between a central node and a fixed remote or mobile user terminal. The central node can be located at either a fixed location on the Earth in a terrestrial radio system or as part of an orbiting satellite in a satellite radio system.

Digital radio systems transmit and receive digital message information, e.g., computer or Internet data. Alternatively, digital radio systems accept analog message information, e.g., voice or video data, and convert this analog information to a digital format during transmission and reception. Accordingly, a central node transmits message information in a digital format using downlink beams defined by a multibeam antenna to a fixed remote or mobile user terminal where the receiver processes the digital message information to extract user message information. In some satellite radio systems, the central node processing is divided between a satellite repeater and a ground-based station processor.

User terminals within the same beam coverage area generally avoid mutual interference through the use of some form of multiple access scheme. Conventional multiple access radio services use Frequency Division Multiple Access (FDMA), Time Division Multiple Access (TDMA), Code Division Multiple Access (CDMA), or some combination thereof. Generally, FDMA separates users into different frequency subbands; TDMA separates users into different time intervals or slots; and, CDMA separates users by assigning different signature waveforms or codes to each user. These CDMA codes can be either orthogonal, i.e., there is no interference between synchronized users, or quasi-orthogonal, i.e., there is some small interference between users. FDMA and TDMA are orthogonal multiple access (OMA) schemes because with ideal frequency filters and synchronization there is no mutual interference. Another example of an OMA system is CDMA with orthogonal codes. Quasi-Orthogonal Multiple Access (QOMA) systems include CDMA with quasi-orthogonal codes and FDMA/TDMA with randomized frequency hopping.

For an isolated beam, an OMA scheme generally provides a larger system capacity than a QOMA scheme. However, when other beams are taken into account, practical systems often use QOMA schemes for reducing interference between users to acceptable levels.

Interference between a user in one beam and users in other beams is normally reduced by crossbeam antenna attenuation. However, in OMA radio systems, such cross-beam attenuation usually does not reduce interference enough to allow the reuse of the same orthogonal waveform or channel in adjacent beams. Instead, channel management is typically required for determining when a multiple access channel can be reused in another beam. This leads to a reuse factor that is less than 1. The reuse factor for an orthogonal channel is defined as the number of user terminal assignments to that orthogonal channel in different beam coverage regions divided by the total number of beam coverage regions. Because the capacity of a multiple access system is proportional to the average value of the reuse factor with respect to all the multiple access channels, it is desirable to make the reuse factor for each multiple access channel as large as possible subject to interference constraints. Practical limitations on multibeam antennas typically cause the reuse factor in conventional cellular OMA systems to vary between $\frac{1}{3}$ and $\frac{1}{12}$.

In contrast, in a QOMA radio system, e.g., the uplink of a CDMA radio system in the IS-95 standard, the reuse factor can be unity because the crossbeam antenna attenuation can be sufficient to keep mutual interference between users in different beams to adequately small levels. However, one drawback is that a QOMA radio system generally has a theoretical capacity that is less than that of an OMA radio system.

Conventional multiple access digital radio systems provide means for coding/decoding message information for error correction, means for interleaving/deinterleaving the message information, and a transmission format for the message information that includes a reference signal. The reference signal is generated and transmitted at the central node and used by the user terminal receiver for obtaining channel parameters to aid in demodulating a user signal.

Further, the message information is conventionally coded for transmission on both quadrature axes of a radio frequency carrier, e.g., cos $\omega$t and sin $\omega$t. One example of quadrature coding is to alternate coded symbols between the two axes. Error correction coding techniques that use a complex signal constellation also exploit both quadrature axes. For a single-axis coder in which the coder only exploits one of the two quadrature axes, i.e., the coder output is real, the information rate is reduced by a factor of two relative to quadrature coding. On the other hand this dimension reduction provides a more robust signal form in the presence of interference.

In downlink transmissions from a central node to a particular user terminal, the central node transmitter may include a multibeam antenna and one of these beams includes the particular user terminal. Generally the user terminal has a single antenna for receiving the downlink transmission. Adaptive equalization of multiple antenna signals cannot be applied to a downlink system because these techniques must be applied at the receiver, i.e. the user terminal.

At a user terminal with a single antenna, interference cancellation techniques that process multiuser signals with different signatures can be employed. Examples of these multiuser processors are given in *Linear Multiuser Detectors for Synchronous Code-Division Multiple Access Channels*, R. Lupas and S. Verdu, IEEE Transactions on Information Theory, vol. IT-35, No. 1, pp. 123–136, January 1989; *Decorrelating Decision-Feedback Multiuser Detector for Synchronous Code-Division Multiple Access Channels*, A. Duel-Hallen, IEEE Transactions on Communications, vol. COM-41, No. 2, pp. 285–290, February 1993; and, *A Family of Multiuser Decision Feedback Detectors for Asynchronous Code-Division Multiple Access Channels*, A. Duel-Hallen, IEEE Transactions on Communications, vol. COM-43, Nos. 2, 3, 4, February–April 1995.

Further, *Transmitter Precoding in Synchronous Multiuser Communications*, B. R. Vojcic and Won Mee Jang, IEEE Transactions on Communications, vol. 46, No. 10, October 1998, shows a precoding method employed at a single antenna transmitter to provide interference cancellation between quasi-orthogonal signals that have different signatures.

However, in an OMA technique the same channels or signatures are reused in adjacent beam coverage areas so as to increase the reuse factor. At a single antenna user terminal, there is no antenna discrimination; and, because the signatures are the same, there is no signature discrimination. Thus, the multiuser processor and transmitting precoding techniques referenced above are not applicable to a downlink OMA system with a single user terminal antenna.

Precoding at the transmitter in a downlink system is analogous to equalization at the receiver in an uplink system. Numerous algorithms for precoding, i.e., beamforming, have been proposed to reduce both co-channel, i.e., other user interference, and intersymbol interference in downlink transmissions. An example of such an algorithm is given in *Transmit Beamforming and Power Control for Cellular Wireless Systems*, F. Rashid-Farrokki, K. J. Ray Lui, and L. Tasseulas, IEEE Journal on Sel. Areas of communication, vol. 16, No. 8, pp. 1437–1450, October 1998. In this article a transmitter precoding method is described for cellular systems that reduces both other user and intersymbol interference. The objective according to the authors is to either reduce the frequency reuse distance or increase the channel capacity. However, the authors do not disclose that a reuse factor of unity, i.e., a frequency reuse distance of zero, can be achieved nor do they introduce and combine additional elements such as error-correction coding, interleaving, and periodic channel assignment changes.

Future multiple access radio systems will be unsymmetrical with typically greater downlink than uplink channel capacity requirements in order to satisfy Internet downloading demands. This future unsymmetrical capacity requirement places increased emphasis on finding techniques to increase downlink capacity.

The capacity of a downlink system is either limited by user interference in an OMA system, which keeps the reuse factor less than unity, or theoretically limited by the choice of QOMA. It would be desirable to have a multiple access scheme that can be used to obtain a unity reuse factor in downlink transmissions from one or more central nodes to a plurality of user terminals.

SUMMARY OF THE INVENTION

With the foregoing background in mind, it is an object of the invention to provide a downlink multiple access communication system with increased channel capacity and improved communications quality.

Another object of the invention is to provide a downlink multiple access communication system that is orthogonal in each beam coverage area, and has a channel capacity greater than that of conventional quasi-orthogonal multiple access communication systems.

Still another object of the invention is to provide an orthogonal multiple access communication system that has a unity reuse factor.

The foregoing and other objects are achieved in a multiple access communication system including a plurality of user terminals, each including a user terminal receiver, and one or more central nodes each including a central node transmitter for transmitting digital message information to the user terminal receivers. The digital message information is generally different for each user in the multiple access scheme. User terminal receivers are located within a beam coverage area; and, within this area, users are assigned mutually orthogonal multiple access channels. Users in areas covered by adjacent beams reuse the same multiple access channels. Thus, interference due to antenna spillover at beam boundaries could produce interference between users assigned to different beams, but with the same multiple access channel. Reduction or elimination of this interference is accomplished in the central node transmitter by a combination of coding/interleaving, periodic channel assignment changes, precoding, and 90° phase rotations.

Two or more central nodes may be connected together with fixed communication links, i.e., coaxial cable, microwave radio, or fiber optic cable. By transferring signal and channel parameter estimates over these communication links the central nodes can coordinate their downlink transmissions so as to achieve a macrodiversity effect. With the transfer of signals and parameters between the central nodes, there is a mathematically equivalent single effective central node and the solution for precoder parameters has the same form with either one or multiple coordinated nodes.

The precoding operation at central node transmitter(s) requires estimates of cross signal transmittance values between the antenna ports and user terminal receivers. In the preferred embodiment for nonreciprocal uplink and downlink these estimates are computed at a central node by correlating reference signals with downlink received versions of these reference signals. The downlink received signals are processed to reduce bit transmission requirements and retransmitted using uplink transmission facilities. The use of some of the uplink capacity to increase downlink capacity is attractive in future multiple access systems with unsymmetrical capacity requirements, i.e., downlink greater than uplink.

In a preferred embodiment, the central node transmitter contains a plurality of source processors, each of which includes an error correction coder and interleaver. Digital message information for each user is coded in a single-axis error-correction coder to provide a sequence of real-valued coded symbols. The restriction of the coding transformation to real values rather than quadrature values greatly improves precoding effectiveness of interference reduction. This sequence is interleaved by distributing the coded symbols amongst groups or frames of coded symbols. The interleaving signal is connected via an orthogonal channel assignment switch to input ports of a plurality of precoders, each of which is associated with an orthogonal multiple access channel assignment. The precoders reduce potential interference at user terminals in different beam coverage areas, but with the same orthogonal channel assignment. Precoder inputs are real valued, but outputs are complex valued.

Reduced interference is also realized by periodically changing the multiple access assignments in a predetermined manner so that the receiver at the user terminal can follow the channel assignment changes. A channel assignment time normally would correspond to a frame of user symbols. The change in channel assignments is realized at the central node transmitter by the channel assignment switch, which changes the connection between source processor outputs and precoder inputs. If there are N orthogonal channel processors and K beams in the multibeam channel, then an NK channel assignment switch between the NK interleaver signals and the NK precoder inputs can be used to periodically switch channel assignments and average the effects of other user interference.

After precoding, each precoded signal is converted in a quadrature modulator to a modulated user signal utilizing both quadrature axes in a radio frequency carrier. The real and imaginary parts of the precoded signal correspond to the quadrature axes of the modulated signal. Since all users are coded to the same quadrature axis, enhanced protection against other user interference can be realized by phase rotating some but not all of the precoded user signals by 90°.

The modulated signals from all the quadrature modulators corresponding to a particular antenna beam port are then added together in a beam combiner whose output is connected to the appropriate port of the multibeam antenna. Each beam output of the multibeam antenna contains a multiple access signal destined for the users located in the beam coverage area associated with that beam. Because of imperfect isolation between antenna beams at any user location, the received signal is a composite of multiple access signals from multiple beams.

Each user terminal receiver includes an antenna for receiving the composite multiple access signal from the central node transmitter, an RF converter that converts the antenna output signal to baseband for receiver processing, a single axis demodulator that converts the baseband signal to a digital data received signal, and a deinterleaver and decoder to recover the digital message information from the digital data received signal.

Still further aspects and advantages will become apparent from a consideration of the ensuing description and drawings.

BRIEF DESCRIPTION OF THE DRAWINGS

The invention will be better understood by reference to the following more detailed description and accompanying drawings in which.

DETAILED DESCRIPTION OF THE INVENTION

A multiple access radio system according to the present invention includes user terminals that have associated digital radio communication links, i.e., forward links or downlinks, from a central node transmitter with a multibeam antenna. Further, users of each beam are assigned orthogonal multiple access (OMA) channels. Examples of OMA schemes that may be used with the multiple access radio system of the present invention include Frequency-Division Multiple Access (FDMA), Time-Division Multiple Access (TDMA), and Orthogonal-Waveform Code-Division Multiple Access (OCDMA), and various combinations thereof.

It is expected that the present invention will allow the reuse of the same orthogonal waveform or channel by different users in adjacent beam coverage areas, thereby making it possible to achieve a reuse factor of 1 in the downlink of an OMA system.

Figure 1:
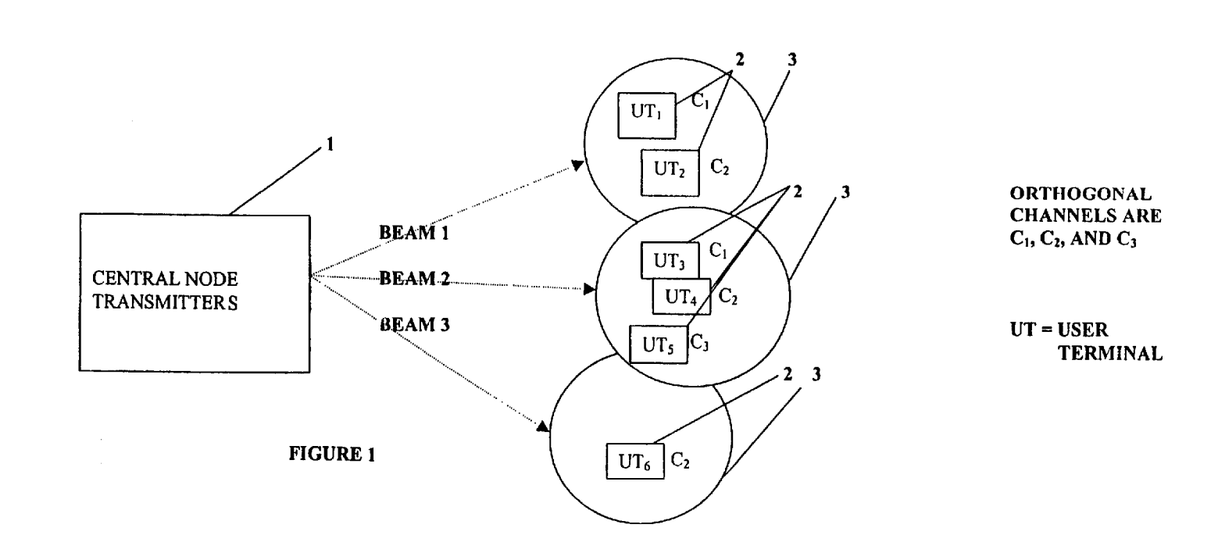
FIG. 1 is a diagram of a multiple-access orthogonal communication system connecting a one or more central node transmitters to multiple user terminals.

FIG. 1 is a diagram of an OMA communication system in a downlink application. In this application a central node transmitter 1 sends digital message information to multiple user terminals 2 located in coverage areas associated with antenna beam boundaries resulting from a multibeam antenna in the central node transmitter 1. For example, in FIG. 1 there are three beams that have three beam coverage areas 3 in which are located the user terminals 2. User terminal $UT_1$ and $UT_2$ are in the upper beam coverage area 3 and use different orthogonal channels $C_1$ and $C_2$. User terminals $UT_3$, $UT_4$ and $UT_5$ are in the middle beam coverage area 3 and reuse orthogonal channels $C_1$ and $C_2$ plus another orthogonal channel $C_3$. In the lower beam coverage area 3 there is only one user terminal 2 that reuses orthogonal channel $C_2$. There is no interference between users in the same cell, but the reuse of orthogonal channels means that there is potential interference between $UT_1$ and $UT_3$ on $C_1$ as there is potential interference between $UT_2$, $UT_4$, and $UT_6$ on $C_2$. In the present invention, this potential interference is reduced or eliminated by processing signals in the central node transmitter, thus allowing reuse of the orthogonal channel assignments.

FIG. 1 is also representative of a macrodiversity system. As indicated in FIG. 1 there may be multiple central node transmitters providing downlink channels to multiple beam regions. For example in FIG. 1, beams 1 and 2 may be associated with the central node containing central node transmitter 1 but beam 3 is a downlink beam to user terminal $UT_6$ that is receiving downlink signals from an adjacent central node that is connected by a communication link to the central node containing central node transmitter 1. The communication link is used to pass signal information so that the two central nodes can act as a single node and thereby achieve a macrodiversity effect. For uplink transmissions this macrodiversity effect might be realized by choosing the better of two uplink transmissions arriving at the two central nodes. An analogous macrodiversity effect can be achieved with precoding on the downlink. In this particular example the precoding of user signals for beams 1 and 2 by central node transmitter 1 would be coordinated with precoding of user signals by central node transmitter 2 in order to take into account mutual interference and diversity protection. For this coordinated precoding, user terminal message signals and cross signal transmittance values are exchanged over the communication link between the central nodes.

Figure 2:
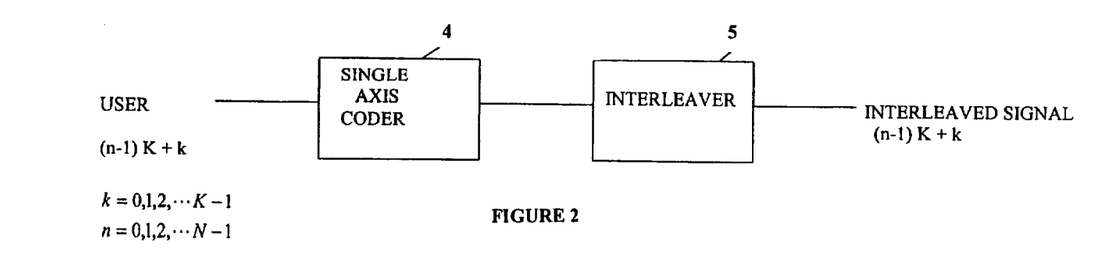
FIG. 2 is a functional block diagram of a source processor in the central node transmitter of the present invention.

Digital message information for each user is converted in a source processor to an interleaved signal by error correction coding and interleaving of the digital message information to produce a sequence of coded/interleaved symbols. The coded symbols are contained within frames or groups of data. For example, in TDMA/FDMA, a frame of data contains the coded symbols for one time slot of transmission. FIG. 2 shows a source processor for a user that has been assigned the nth orthogonal channel in a mutually orthogonal set of N channels, and is destined to a user terminal that is located in beam k of a multibeam antenna with K beams.

The single-axis coder 4 adds redundancy in a predetermined manner so as to provide resistance to noise and interference in the reception of the user signal at the user terminal receiver. The coded data is real, corresponding to a single-axis, and may be either binary or nonbinary depending on system quality and data rate requirements. For example, the single-axis coder 4 may be realized with a binary convolutional coder. Typical parameters for such a coder are rate ½, constraint length 7, and generator functions 133,171. The single-axis coder 4 then provides the coded data to an interleaver 5, which distributes the coded data amongst multiple frames in a predetermined manner.

In a preferred embodiment, the coded data is distributed among the multiple frames as follows. If there are F digital data symbols per frame, then the F symbols are evenly distributed over F frames; e.g., symbol 1 goes in frame 1, symbol 2 goes in frame 2, and so on, until symbol F goes in frame F; and, then the process is repeated until all F frames are full. However, it should be understood that the interleaver 5 may distribute the coded data into the multiple frames in other ways and still achieve a reuse factor of 1 in the downlink of the OMA system.

In some systems, a reference generator may produce a sequence of known data symbols that is multiplexed in each frame of digital data. Examples of reference data sequences include a maximum length pseudo-noise (PN) sequence with length equal to the number of reference symbols to be inserted, or alternatively each reference subburst in a frame may be a portion of a very long PN sequence. The reference data can be used at the user terminal receiver for estimation of channel parameters required in demodulation of the user signal. Alternately separate test signals can be used in a downlink system for parameter estimation at the user terminal receivers. Received reference data or received test signals may also be quantized and retransmitted on an uplink transmission to the central node. At the central node correlation of downlink received reference data or test signals with originally transmitted signals will produce downlink cross signal transmitance values required for precoding operations for the next downlink transmission.

Each frame may include other system or user information such as central node identification, user authorization information, network status, etc., in addition to reference data and the interleaved and coded data provided by the interleaver 5.

The present invention uses orthogonal channel assignments from a mutually orthogonal set and reuses these same channel assignments in each beam coverage area. The limit on the number of orthogonal users is determined by the available bandwidth W and the transmitted symbol time T. The maximum number of orthogonal channels per quadrature axis is equal to WT/2. In the present invention, only one of the two quadrature axes are used in a single-axis coding scheme. Thus, N must be WT/2 or less. In the present invention, the N orthogonal channels are reused in each beam so as to achieve a reuse factor of unity. For a multibeam antenna with K beams, the maximum number of users supported by a central node is then KWT/2. A preferred embodiment is described here corresponding to this maximum number of users.

Figure 3:
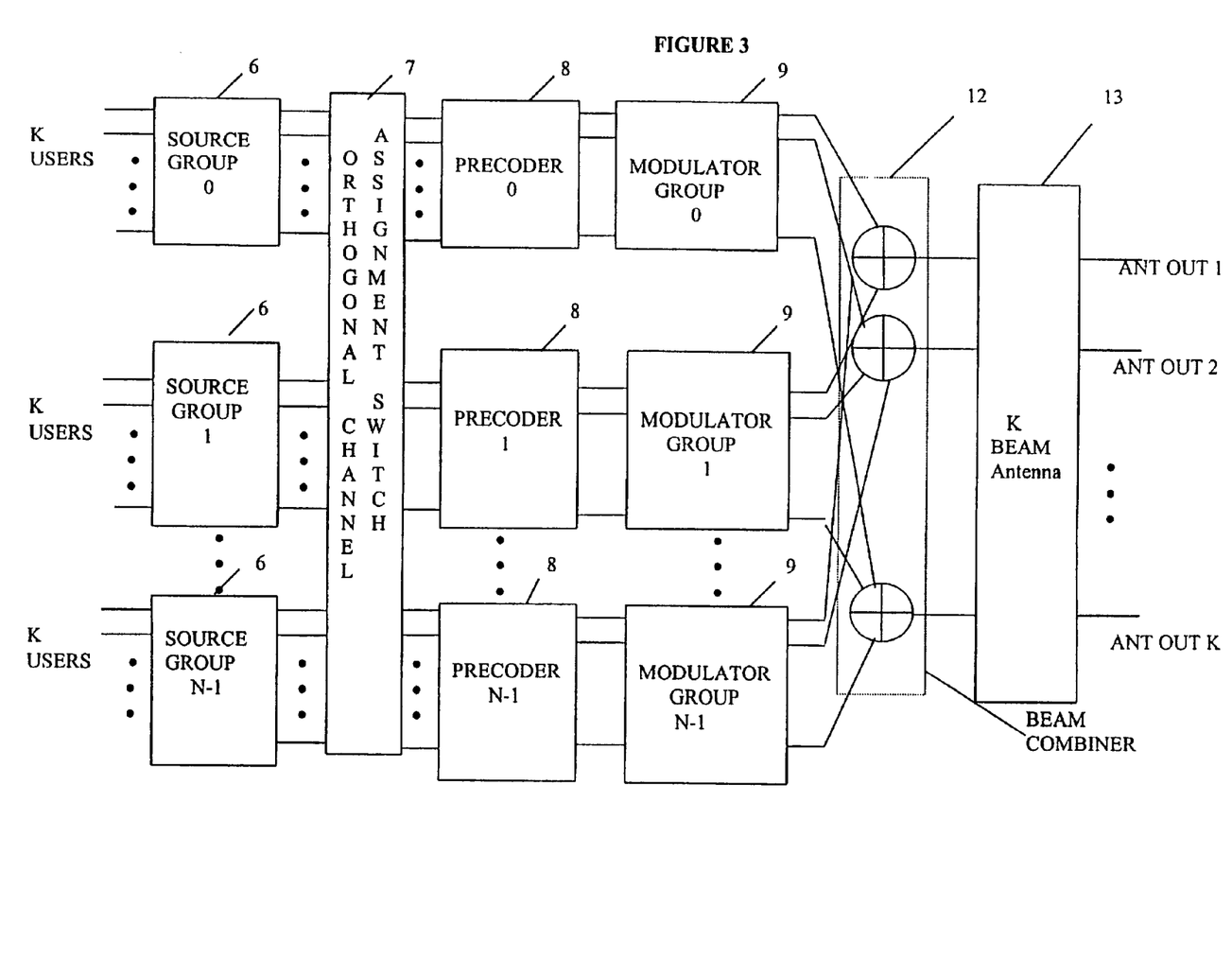
FIG. 3 is a functional block diagram of the central node transmitter employed in the communication system of the present invention.

In FIG. 3, the source processors have been combined into a source processor group 6, which provides coding/interleaving for a group of K users, each of which is in a different beam coverage area. There are up to N=WT/2 orthogonal channels, so there are N K-input/output source processors groups shown in FIG. 3. A randomization of other user interference is achieved with an orthogonal channel assignment switch 7, which switches in a predetermined variable manner the NK interleaved signals at the source processor outputs to the NK precoder inputs at frame interval boundaries. The variable switch changes may be generated from a PN sequence generator or a deterministic algorithm. Since interleaving is accomplished over multiple frames, the effect of orthogonal channel assignment changes every frame is to average other user interference in the subsequent error-correcting decoding at the user terminal. In systems where downlink received signals are retransmitted to the central node for precoder parameter calculation, the group of orthogonal channels should be confined to a frequency band that is less than the coherence bandwidth. With this restriction the precoder parameters for the next frame can be calculated from the retransmitted received signals of the old orthogonal channel for the set of interferers associated with the new orthogonal channel.

A deterministic channel assignment algorithm can be used when the number of orthogonal channels is small and different channel assignments can be easily enumerated. In most communication systems, N is much greater than unity and a pseudo-random assignment is more easily implemented. In a preferred embodiment, a pseudo-random channel assignment algorithm is presented here. In this algorithm, all users are numbered with respect to their beam coverage area. For example, let the beam coverage areas be numbered k=0, 1, 2, . . . ,K-1; and, the nth user, n=0, 1, 2, . . . ,N-1, in beam k be numbered as (n-1) K+k. The N orthogonal channels in the preferred embodiment are contained in a frequency band that is less than the frequency coherence bandwidth. With this numbering system, all users are assigned a number, which modulo K is equal to their beam number. For the N orthogonal channels that are reused in each beam, there are N! ways that the channels can be assigned to the N users in the beam. These channel assignment possibilities can also be designated by a channel assignment integer, I=0, 1, 2, . . . (N!-1). The source processor outputs follow the numbering system so that user (n-1) K+k has its processed information at source processor output (n-1) K+k. There are N precoders in FIG. 3, wherein the nth precoder, n=0, 1, 2, . . . N-1, uses orthogonal channel n. The connections between the K source processor outputs for a particular source group and the N precoders can be represented by the channel assignment integer I. The pseudo-random channel assignment can then be implemented as follows. For source group n, n=0, 1, 2, . . . ,N-1, select a random integer $I_n$ from a uniform distribution of integers 0, 1, 2, . . . , (N!-1) and connect the K source processor outputs of source group n to the N precoders according to the selected integer.

These channel assignment changes are implemented at frame boundaries. For example, in a TDMA system, the frame corresponds to a time slot so that channel assignment changes could be realized at the end of each time slot. To provide interference protection from the coding and interleaving, it is necessary that the interleaving be over many frames so as to average the interference effects at the receiver after deinterleaving. The variable channel assignment combined with interleaving/deinterleaving of coded symbols results in a random user interference at the decoder of the user terminal receiver, thus improving the communication reliability of each central node to user terminal link. The channel assignment pattern is preselected so the user terminal can synchronously employ the same variably selected orthogonal channel at its receiver for processing the received signal.

In FIG. 3, the NK outputs of the source processor groups are applied to the NK×NK channel assignment switch 7, which provides a different variable channel assignment for each frame or multiple frames of data. After switching each of the NK signals, they are precoded for interference reduction. The N precoders 8 are used to reduce interference at user terminals that share the same orthogonal channel assignment. For an application where the interference is primarily due to other user interference, the precoder can be represented by a single matrix operation. If the K precoder inputs associated with one symbol at time mT (T=symbol period) in the frame for the nth, n=0, 1, 2, . . . , N−1, orthogonal channel is represented by the real column vector $\underline{s}_m$, the nth precoder computes the output column vector $$q_m = W_0 \underline{s}_m \quad (1)$$

where $W_0 ij$, i,j=0, 1, . . . K−1, is a complex matrix.

Precoding to achieve intersymbol interference reduction as well as other user interference in the present invention requires that earlier and later source vectors than $\underline{s}_m$ be included in the precoding operation. Thus, a more general precoding would be represented by $$\underline{q}_m = \sum_{j=-J_1}^{-J_2} W_j \underline{s}_{m-j} \quad (2)$$

where the $J=J_2+J_1+1$ matrices $W_J$ define the precoding operation with respect to the J source vectors $\underline{s}_{m-J}$, j= $J_1, -J_1+1, \Lambda, J_2$. In equation (2), the source vectors with indices less than m correspond to earlier source vectors than $\underline{s}_m$, and those with greater indices are later source vectors. Equation (2) shows a precoding operation that has "tap spacing" equal to the symbol period, i.e., the source vectors are separated in time by one symbol period. It is known to one skilled in this art that precoding can be realized with fractional "tap spacing," wherein source vectors are separated by T/M, T being the symbol period and M being an integer greater than one. For simplicity of presentation, a preferred embodiment will be described in the subsequent Precoder Computation section with the symbol period tap spacing of equation (2).

Figure 4:
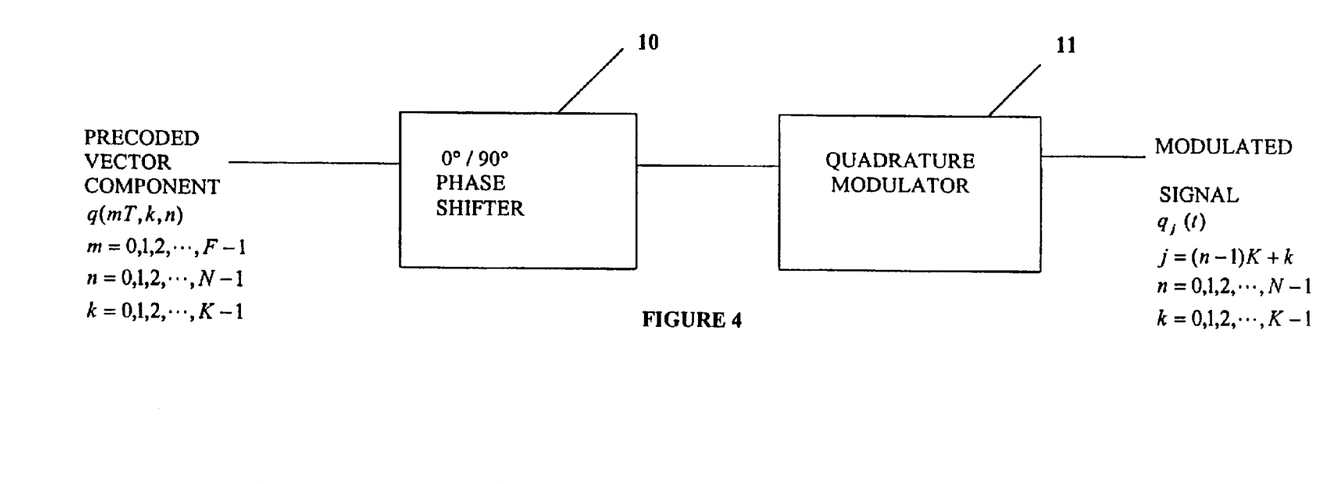
FIG. 4 is a functional block diagram of a modulator in the central node transmitter in the present invention.

The precoded data for a user group sharing the same orthogonal channel is sequentially provided to one of the modulator groups 9 in FIG. 3. A single modulator is shown in more detail in FIG. 4. For each precoder vector component output, the modulator contains a 0°/90° phase shifter 10 and a quadrature modulator 11. The nth precoder generates the vector $q_m$ for the mth symbol in the frame of F symbols, m=0, 1, 2, . . . , F−1. The vector component for the nth precoder and kth output is designated as q (mT,k,n). These symbol values are complex because the precoding matrices are complex. The modulator group converts the complex baseband signal composed of the symbol set q (mT,k,n), m=0, 1, 2, . . . ,F−1, into a waveform $q_j(t)$, j=(n−1)K+k, which represents the nth, n=0, 1, 2, . . . ,N−1, orthogonal waveform. The conversion is accomplished with a phase shifter and a modulator. The phase shifter provides improved protection at the user terminals against other users with the same orthogonal channel assignment, but it should be understood that its use is optional. The phase shifter applies a 90° phase shift to some of the K precoder outputs in order to provide additional interference protection by placing signal pairs in quadrature. In a preferred embodiment, a phase-rotation algorithm called the maximum quadrature interference algorithm is suggested in section 3, Maximum Quadrature Interference Algorithm for P, below. After phase rotation, the rotated precoded signal in a frame is provided to a quadrature modulator 11, which converts the frame data to a modulated user signal suitable for transmission over a downlink to a user terminal receiver using a radio frequency (RF) channel. In particular, the frame data, which is complex, is converted by the quadrature modulator 11 such that the real and imaginary components are converted to the quadrature (cos ωt/sin ωt) axes of the modulated signal.

For each of the K beams, a beam combiner 12 combines modulated signals destined for user terminals in the same beam coverage area. In the numbering system described, all users with numbers modulo K equal to k are provided to the same beam port, k=0, 1, 2, . . . ,K−1. In a TDMA system, for example, orthogonality is achieved by employing different time slots, so the beam combiner would combine all signals with different time slots destined for transmission to a particular beam coverage area. The beam signals produced by the beam combiner are applied to the multibeam antenna 13 for transmission toward the user terminal.

Figure 5:
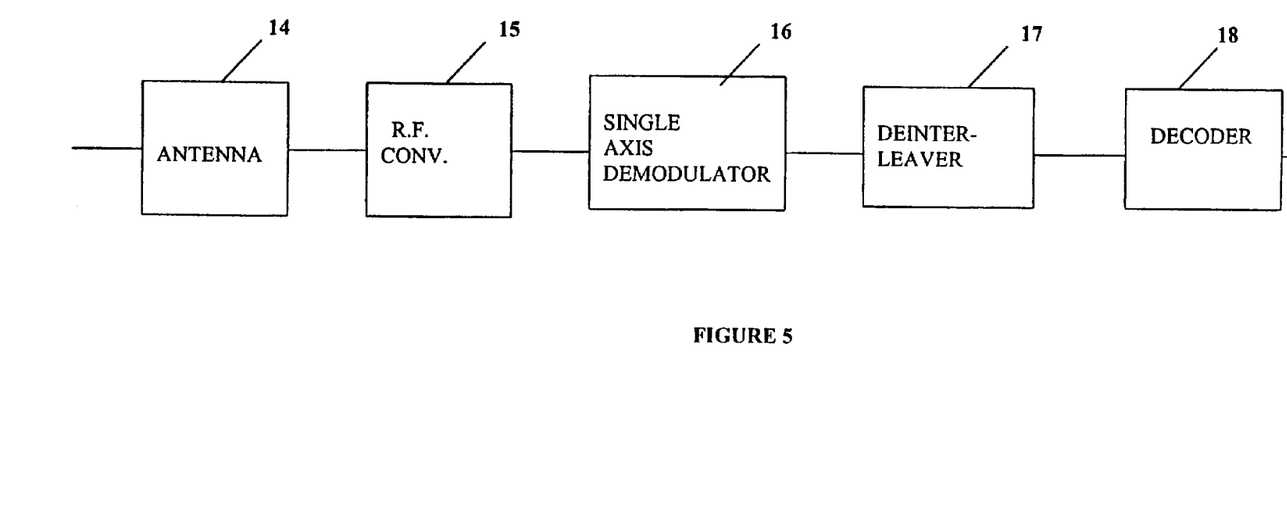
FIG. 5 is a functional block diagram of a user terminal receiver at the user terminal in the communication system in the present invention.

FIG. 5 illustrates a receiver at a user terminal for reconstruction of the user digital information signals. Although diversity provided by multibeam antenna reception is possible at the user terminal, FIG. 5 shows a single antenna 14 configuration followed by an RF converter 15 for shifting the RF signal to a downconverted intermediate or baseband frequency level. The single axis demodulator 16 employs a locally generated pilot signal or reference signal in order to coherently demodulate the downconverted signal. The deinterleaver 17 reconstructs the original frame order by reversing the interleaver function 5 in the transmitter. The decoder 18 exploits the redundancy added by the transmitter single-axis coder 4 so as to reduce the likelihood of bit errors in the recovered user digital message information. Subsequent processing, e.g., digital-to-analog conversion (not shown), of the digital message information results in the message information of the particular user.

1. Precoder Computation

The computation required by a precoder 8 in FIG. 3 can be accomplished in different ways. In general, the precoder solution is a function of the path gains to the K users, the cross signal transmittance resulting from the multibeam antenna, and the K 0°/90° values resulting from the phase shifter 10. These phase shift values can be summarized in a diagonal matrix P whose diagonal values are $$P_{kk} = e^{j\theta_k}, \theta_k = 0° \text{ or } 90° \quad (3)$$

The output of the precoder after phase rotation can be represented as a complex column vector of the rank K, viz., $$\underline{b}_m = P\underline{q}_m \quad (4)$$

Note in this description that the computation is described for a particular orthogonal channel. It should be understood that, in general, a different matrix set and P are computed for each orthogonal channel.

Depending on the location of the K users in an orthogonal set, there are a set of K path gains $g_k$ between the central node transmitter and each of the user terminal receivers. The real diagonal matrix G has diagonal elements $G_{kk}=g_k$, $k=0, 1, \Lambda, K-1$ ($\Lambda$ means "for all")

which may be normalized relative to the maximum path such that $g_k \leq 1$.

Leakage of a signal in one beam to another beam is described by a cross signal transmittance matrix $M_i$, wherein $M_i(k,l)$ represents the signal component in beam l from user signal k at time $(m-i)T$, $k,l=0, 1, 2, \ldots, K-1$. With this definition the received signal at a user terminal receiver, which is time synchronized to the transmit symbol time mT at each of the K user terminal locations, can be described by the real vector $\underline{R}_m$, at symbol time mT, $$\underline{R}_m = \sum_{i=-I_1}^{I_2} \text{Re}(P'GM_i P \underline{q}_{m-i}) + \underline{u}_m \quad (5)$$

where Re( ) represents the real part, P is the diagonal phase rotation matrix of equation (3), $\underline{q}_{m-i}$ is the output of the precoder unit 8 shown in FIG. 3 at symbol time $(m-i)T$, and $\underline{u}_m$ is a real noise vector representing the additive noise associated with the mth symbol in the frame at each of the K user locations. Equation (5) takes into account both other user interference due to the matrix $M_o$, and a combination of other user and intersymbol interference through the matrices $M_i$, $i \neq 0$. The real component (Re) is used in equation (5) to include the coherent demodulation, which occurs at each user receiver terminal.

The representation of the received signal vector Eq. (5) and the precoded vector Eq. (2) is also valid for a macrodiversity technique where multiple central node transmitters are used to serve user terminals. In this technique the central nodes are connected together with fixed communication links, i.e., coaxial cable, microwave radio, or fiber optic cable. By transferring signal and channel parameter estimates over these communication links the central nodes can coordinate their downlink transmissions so as to achieve a macrodiversity effect. For example in FIG. 1 let beams 1 and 2 correspond to a multibeam antenna associated with a first central node transmitter 1 and let beam 3 correspond to a single beam antenna associated with a second central node transmitter 1. A particular orthogonal channel achieves a unity reuse factor in this example if it is shared amongst three users that are each in one of the three beam coverage regions 3 of FIG. 1. Eq. (2) defines this macrodiversity configuration where the first central node transmitter generates the precoder components $q_{m1}$ and $q_{m2}$ at time mT and the second central node transmitter generates the precoder component $q_{m3}$. Since the precoding in Eq. (2) requires the source values for all the user terminals, the source values for the respective control nodes must be exchanged over the fixed communication link. Eq. (5) is unchanged in its form although the antenna ports are at two physically different locations. The subsequent solution Eq. (11b) for the preferred embodiment can then be applied to find the precoder matrix that is used at both central nodes in this macrodiversity example.

For simplicity of presentation the solution for the set of precoder matrices in Eqs. (5) and (2) will be shown for the single intersymbol interference echo, i.e. $I_1=0$, $I_2=1$ in Eq. (5). This solution can then be easily generalized to any values of $I_1$ and $I_2$. For a single intersymbol interference echo, Eq. (5) can be rewritten as $$\underline{R}_m = \text{Re}(P'GM P_2 \underline{\beta}_m) \text{ where} \quad (5a)$$

$$M = [M_0 \quad M_1]$$

$$P_2 = \begin{bmatrix} P & O \\ O & P \end{bmatrix}$$

and an expanded precoded vector has been defined as $$\underline{\beta}_m = W \underline{b}_m$$

where the precoder matrix and source vectors are defined as $$W = \begin{bmatrix} W_0 & W_1 & 0 & 0 \\ 0 & 0 & W_0 & W_1 \end{bmatrix}$$

$$\underline{b}_m = \begin{bmatrix} \underline{S}_m \\ \underline{S}_{m-1} \\ \underline{S}_{m-1} \\ \underline{S}_{m-2} \end{bmatrix}$$

The preferred embodiment computes the solution for the precoder matrix W directly and can be implemented by standard matrix inversion procedures. The direct solution is applicable when the channel assignments change every frame and precoder parameters are estimated from either uplink channel parameters in a reciprocal channel configuration or from retransmitted received downlink signals. A method is then given for computing the 0°/90° phase rotation matrix P. With the direct solution the matrices P and W can be found for each frame of transmitted data. A least-means-squares (LMS) algorithm based on the noisy gradient, steepest-descent algorithm given in *Adaptive Filters, I; Fundamentals*, Stanford Electronics Laboratory, Stanford University, Stanford Calif., Tech. Rep. 6764–6, December 1966 by B. Widrow is then described as an alternative embodiment for finding the precoder matrix W when channel assignments are fixed over a large number of frames. The least-mean-squares (LMS) algorithm is an estimated gradient algorithm that tracks the optimum of a quadrature error functional. This algorithm is a well known technique for correlating received signal values with known transmitted values in order to obtain processor parameters.

2. Direct Solution for W

To compute W, first one can define the K×K complex matrix that defines the cross-link interference characteristics, i.e., $$A = P'GMP_2 = C + jD \quad (6)$$

and the K×2K real matrix composed of the real and imaginary component of A, viz., $$F = [C:D] \quad (7)$$

The W matrix can be defined as a set of 2K row vectors, i.e., $$W = \begin{bmatrix} w'_0 \\ w'_1 \\ M \\ w'_{2K-1} \end{bmatrix} \quad (8)$$

where "'" denotes complex transpose and $\underline{w}_k$ is a column vector of rank 4K. Decomposing these vectors into real and imaginary parts $$\underline{w}_\lambda = \underline{u}_k + j\underline{v}_k$$

and then W can be represented by the 4K×2K real matrix $$Y = \begin{bmatrix} U \\ V \end{bmatrix}, \quad U = \begin{bmatrix} u'_0 \\ u'_1 \\ M \\ u'_{2K-1} \end{bmatrix}, \quad V = \begin{bmatrix} v'_0 \\ v'_1 \\ M \\ v'_{2K-1} \end{bmatrix} \quad (9)$$

With these definitions and the use of a single axis coder that restricts the generalized source vector $\underline{b}_m$ to a single quadrature axis, i.e., $\underline{b}_m$ is real, equation (5a) can be rewritten as $$\underline{R}_m = FY\underline{b}_m + \underline{u}_m \quad (10)$$

for which a solution that cancels interference is $$Y = \xi^{1/2} F'(FF')^{-1} \quad (11a)$$

The minimum mean-square error solution is usually preferrable because it results in a smaller error rate. This solution is $$Y = \xi^{1/2} F'(FF' + \sigma^2 I)^{-1} \quad (1b)$$

The parameter $\xi$ is a constant defined by the power requirements at the central node transmitter. For example, an average power constraint requires that $$E\|PW\underline{b}\|^2 \leq K\alpha \quad (12)$$

For the special case where there is no intersymbol interference and when the user signals are independent and have unit average power, i.e., $$E(s's) = K$$

the constant $\xi$ is given by $$\xi = \alpha \Bigg/ \sum_{m=0}^{2K-1} \sum_{n=0}^{K-1} E(Y_{mn}^2)$$

The expectation in determining the constant $\xi$ is with respect to a different realization of the matrices G and M for each frame.

3. Maximum Quadrature Interference Algorithm for P

In the preferred embodiment, the steps for computing the P matrix are defined by an algorithm called the maximum quadrature interference algorithm. The purpose of this algorithm is to iteratively find pairs of beams that have the largest coupling, and choose 0°/90° assignments so that users sharing the same orthogonal channel in these paired beam coverage areas have quadrature phase rotations. In this algorithm, the overbar signifies the binary opposite, i.e., $\overline{0} = 1$.

Step 0: Initialize
Selected Beam Index: $I_k = 0$, $k=0,1,\Lambda, K-1$
Rotation Index: $q=0$, $k=0,1,\Lambda, K-1$
Step 1: Find eligible pairs with largest cross-linked quadrature component coupling:
Let $x = \max(\eta_{mn})$ for all m,n where $I_m = 0$ Or $I_n = 0$ and $c_{mn} = E_{mn}E_{nm}^* + E_{mn}E_{nn}^*$ where the general cross-signal
matrix is E=GM and one defines $c_{mn} = a_{mn} + jb_{mn}$ $\eta_{mn} = \max(|a_{mn}|, |b_{mn}|)$ Step 2: Make quadrature assignments:
If x=0 stop, else
For m and n found in Step 1
if $|a_{mn}| \leq |b_{mn}|$
if $I_n = 0$
$q_n = \overline{q}_m$
else
$q_m = \overline{q}_n$
else
if $I_n = 0$
$q_n = q_m$
else
$q_m = q_n$
Step 3: Update Selected Beam Index
set $I_n = 1$ and $I_n = 1$
go to Step 1
end algorithm After the algorithm stops, the diagonal values of the matrix P are found by $P_{k\lambda} = \exp(j\pi q_k/2)$ $k=0,1,\Lambda, K-1$.

The solution for the rotational matrix P and the precoding matrix W requires knowledge of the general cross-signal matrix E. In a time division duplex system, for example, wherein the downlink and uplink time-share the same frequency band, the matrix elements of E may be determined from uplink measurements at the central node. In a frequency division duplex system, wherein uplink and downlink frequencies are sufficiently separated so that the uplink and downlink characteristics are different, the matrix elements of E can be estimated at the central node by feedback to the central node of received signal values at the user terminals. One of ordinary skill would recognize that correlation of these received signal values with corresponding reference signal values that were transmitted on the downlink will produce estimates of these matrix elements. The estimate of E can then be used to find W directly by the preferred embodiment procedure described here, or an alternative embodiment iterative technique to estimate the precoding matrix W. The alternative embodiment is next described for environments where the channel switching occurs infrequently.

4. Adaptive Solution

As an alternative embodiment the channel assignment switch is only activated after many frames so that an adaptive recursive solution can be realized. The least-mean-squares (LMS) algorithm previously referenced is an estimated gradient algorithm that tracks the optimum of a quadrature error functional. This algorithm is a well known technique for correlating received signal values with known transmitted values in order to obtain processor parameters. The quadrature error in this precoding application is the difference between the vector of received signal values (Eq. (5)) at each user terminal and the desired source value vector, viz., $$\underline{e}_m = \underline{R}_m - \underline{s}_m \quad (13)$$

where the index m corresponds to the symbol time mT when $\underline{s}_m$ was generated. The received vector components are realized at the user terminals at time $mT+\tau_k$, wherein $\tau_k$ is the propagation delay to the kth user terminal. In a preferred embodiment, the received vector components are sent back to a receiver at the central node by feedback links such that after an appropriate delay the central node has both $\underline{R}_m$ and $\underline{s}_m$ for adapting the next iteration. These iterations may be continuous or on a frame-by-frame basis. In the alternative embodiment, a general form of the LMS algorithm applied to this precoding problem is to update the mth precoding matrix group by $$W_j(m+1) = (1-\Delta_1)W_j(m) - \Delta_1 G_j(m) \quad -J_1 \leq j \leq J_2 \quad (14)$$

where $\Delta_1$ is a step-size constant and the gradient estimate is $$G_j(m) = \sum_{i=-I_1}^{I_2} A'_i \underline{e}_m \underline{s}'_{m+j-i} \quad (15)$$

and $$A_i = P'GM_i P \quad -I_1 \leq i \leq I_2 \quad (16)$$

The "'" indicates complex transpose and $\underline{e}\,\underline{s}'$ is an outer product matrix. When $I_1 = I_2 = J_1 = J_2 = 0$, these equations are an iterative solution to the direct matrix inversion solutions in Eq. (11).

In the alternate embodiment the rotation matrix P is fixed for many iterations. It may be periodically reset after a channel assignment change by using the maximum quadrature interference algorithm described earlier in the invention at the beginning of a new recursion epoch.

The cross-signal matrices A, for a fixed P may be deduced in some applications from a combination of available parameters such as power control values, user location from Global Positioning System (GPS) measurements, and computed antenna characteristics. Alternatively, the matrices can be estimated by a recursive algorithm at the central node using the feedback vector $\underline{\tau}_m$. A cross-signal matrix estimation is accomplished by the recursion $$\hat{A}_1(m+1) = (1-\Delta_2)\hat{A}_i(m) + \Delta_2 \underline{R}_m \underline{q}_{m-i}(m) \quad (17)$$

where $\Delta_2$ is another step-size constant and the prerotated, transmitted vector at time mT is $$\underline{q}_m(m) = \beta_m \sum_{j=-J_1}^{J_2} W_j(m)\underline{s}_{m-j}. \quad (18)$$

The constant $\beta_m$ is used to fix the average transmit power at the central node. Extending equation (12) to the general case we have $$E\|P\underline{q}_m(m)\|^2 = E\|\underline{q}_m(m)\|^2 \leq K\alpha.$$

This constraint is satisfied by computing $$\gamma_m = (1-\Delta_3)\gamma_{m-i} + \Delta_3\|\underline{q}_m(m)\|^2 \quad (19)$$

where $\Delta_3$ is a step-size constant, and letting $$\beta_m = K\alpha/\gamma_m. \quad (20)$$

To get the intersymbol interference index shift required in the recursion of equation (17), one computes the vectors according to $$\underline{q}_{m-i}(m) = \beta_m \sum_{j=J_1}^{J_2} W_j(m)\underline{s}_{m-j-i}. \quad (21)$$

In the adaptive mode, the estimates $\hat{A}_i(m)$, $i = -I_1, \Lambda I_2$, are used in the gradient calculation for $G_1(m)$ in equation (15).

It is expected that the combination of single-axis coding, interleaving, predetermined variable channel assignment changes, preceding, and 90° phase rotations in an OMA radio system will prove to be key factors in achieving a reuse factor of 1 in the downlinks of the OMA system.

While a preferred and alternative embodiments have been shown and described in accordance with the present invention, it is understood that the same is not limited thereto, but is susceptible to numerous changes and modifications as known to a person skilled in this art. Accordingly, the present invention should not be limited to the detail shown and described herein, but is intended to cover all such changes and modifications as are obvious to one of ordinary skill in this art.

Therefore, the present invention should be limited only by the spirit and scope of the appended claims.

What is claimed is:

1. A method of communicating digital data information that is different for each of a plurality of user terminals from a central node transmitter at a central node, which is connected to an adjacent central node by a fixed communication link, to the plurality of user terminals located within a plurality of beam coverage areas produced by a multibeam antenna at the central node, using a set of mutually orthogonal channels for user terminals within a beam coverage area and reusing the same orthogonal channels for user terminals in other beam coverage areas, comprising the steps at the central node transmitter of:

single-axis coding of digital data information to provide a sequence of real valued coded symbols;

interleaving coded symbols among a plurality of data groups, thereby producing a user interleaved signal for each associated user terminal;

assigning a plurality of user interleaved signals to a particular orthogonal channel;

precoding with complex matrix multiplications of a plurality of user interleaved signals that are assigned to the same orthogonal channel to provide a precoded signal vector;

modulating the precoded signal vector to provide a plurality of quadrature modulated waveforms one for each of the associated beam coverage areas;

combining modulated waveforms associated with different orthogonal channel assignments and associated with users in the same beam coverage area thereby producing a beam signal;

transmitting beam signals from a multibeam antenna.

2. The method of claim 1 wherein the modulating step further includes:

selecting components of the precoded signal vector;

phase rotating selected components by 90°.

3. The method of claim 2 wherein the selecting step further includes:

iteratively selecting one of two precoder signal vector components for pairs that have the largest joint interference.

4. The method of claim 2 wherein the precoding step further includes:

correlating downlink received signals that have been retransmitted from user terminals back to the central node with user terminal reference signal values to provide precoder parameters.

5. The method of claim 1 wherein the precoding step further includes:

receiving over the fixed communication link interleaved signals originating at the adjacent central node and producing a precoded signal vector including user interleaved signals associated with both central nodes.

6. The method of claim 1 wherein the assigning step is accomplished periodically with a period that is less than the duration of the interleaving interval of the interleaving step.

7. A multiple access communication system comprising:

a plurality of user terminals located within a plurality of beam coverage areas; and one or more central nodes each including a central node transmitter that sends digital message information, which is different for each user terminal, using a set of mutually orthogonal channels for user terminals within a beam coverage area and reusing the same orthogonal channels for user terminals in other beam coverage areas, wherein the central node transmitter includes a plurality of source processors, wherein at least one source processor includes a single-axis coder that produces from digital message information a sequence of real valued coded symbols, and an interleaver that distributes coded symbols among a plurality of data groups, thereby producing an interleaved signal, a plurality of precoders, wherein at least one precoder is associated with an orthogonal channel and the precoder has as its number of inputs the number of beam coverage areas sharing the same orthogonal channel, and wherein the precoder multiplies signals at the precoder inputs by a complex matrix to produce a precoded signal vector, an orthogonal channel assignment switch that assigns an interleaved signal to a particular orthogonal channel and connects the interleaved signal to the inputs of the respective precoder, a plurality of modulators, wherein at least one modulator is associated with a component of a precoded signal vector, that converts the components of precoded signal vectors to quadrature modulated signals, a beam combiner that combines quadrature modulated signals associated with users in the same beam coverage area thereby producing a beam signal, and a multibeam antenna that transmitts beam signals.

8. A multiple access communication system according to claim 7, wherein the modulator further includes a 0°/90° phase shifter that rotates the precoded vector components.

9. A multiple access communication system according to claim 8, wherein the 0°/90° phase shifter further includes means for iteratively selecting one of two precoder component pairs for pairs which have the largest joint interference.

10. A multiple access communication system according to claim 8, wherein the precoder further includes first means for correlation of downlink received signal values and user terminal signals, and second means for calculating complex matrices.

11. A multiple access communication system according to claim 7 wherein the precoder further includes one or more additional beam coverage areas corresponding to an adjacent central node and the precoded signal vector includes interleaved signals associated with the additional beam coverage areas.

12. A multiple access communication system according to claim 7, wherein the orthogonal channel assignment switch is activated periodically with a period that is less than multiple frame delay of the interleaver.

* * * * *